United States Patent
Harayama et al.

(10) Patent No.: US 9,991,479 B2
(45) Date of Patent: Jun. 5, 2018

(54) SEALED BATTERY

(71) Applicant: TOYOTA JIDOSHA KABUSHIKI KAISHA, Toyota-shi, Aichi (JP)

(72) Inventors: Takashi Harayama, Toyota (JP); Kazuyuki Kusama, Nagoya (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 407 days.

(21) Appl. No.: 14/786,744

(22) PCT Filed: Apr. 24, 2013

(86) PCT No.: PCT/JP2013/062098
§ 371 (c)(1),
(2) Date: Oct. 23, 2015

(87) PCT Pub. No.: WO2014/174616
PCT Pub. Date: Oct. 30, 2014

(65) Prior Publication Data
US 2016/0099441 A1 Apr. 7, 2016

(51) Int. Cl.
| | | |
|---|---|---|
| *H01M 2/06* | (2006.01) | |
| *H01M 2/04* | (2006.01) | |
| *H01M 2/02* | (2006.01) | |
| *H01M 2/08* | (2006.01) | |
| *H01M 2/20* | (2006.01) | |
| *H01M 2/30* | (2006.01) | |
| *H01M 10/0525* | (2010.01) | |

(52) U.S. Cl.
CPC ......... *H01M 2/0262* (2013.01); *H01M 2/024* (2013.01); *H01M 2/0434* (2013.01); *H01M 2/06* (2013.01); *H01M 2/08* (2013.01); *H01M 2/206* (2013.01); *H01M 2/30* (2013.01); *H01M 10/0525* (2013.01); *H01M 2220/20* (2013.01)

(58) Field of Classification Search
CPC ...... H01M 2/024; H01M 2/0434; H01M 2/06; H01M 2/08; H01M 2/30; H01M 10/0525; H01M 2220/20; H01M 2/0262; H01M 2/206
See application file for complete search history.

(56) References Cited

U.S. PATENT DOCUMENTS

2012/0189908 A1* 7/2012 Tsutsumi ............... H01G 9/016
429/179

FOREIGN PATENT DOCUMENTS

| JP | 2010-282847 A | 12/2010 |
|---|---|---|
| JP | 2013-41752 A | 2/2013 |
| JP | 2013041752 A * | 2/2013 |

* cited by examiner

*Primary Examiner* — Basia A Ridley
*Assistant Examiner* — Heng M. Chan
(74) *Attorney, Agent, or Firm* — Sughrue Mion, PLLC

(57) ABSTRACT

A sealed battery 10 is provided, which has a seam 45 between a case main body 21 and a lid 22 on an outer surface 22A side of the lid 22, and in which this seam 25 is laser welded. A terminal 40 connected to an electrode assembly in the battery 10 is led to the outside from a through hole in the lid 22 and is separated from the lid outer surface 22A by an outside resin member 60. The outside resin member 60 is constituted of a resin matrix 62, which is formed of a nonaromatic resin composition, and inorganic fibers 64 present dispersed in the resin matrix 62. At least 50% by mass of the inorganic fibers 64 in the outside resin member 60 is disposed such that the fiber axial direction of the inorganic fibers 64 is parallel to the outer surface of the lid 22.

10 Claims, 14 Drawing Sheets

SEALED BATTERY

CROSS REFERENCE TO RELATED APPLICATIONS

This application is a National Stage of International Application No. PCT/JP2013/062098 filed Apr. 24, 2013, the contents of all of which is incorporated herein by reference in its entirety.

TECHNICAL FIELD

The present invention relates to a sealed battery in which an electrode assembly is housed in an outer case.

BACKGROUND ART

Batteries having a configuration in which an electrode assembly having a positive electrode and a negative electrode is sealed within an outer case are known. In a structure typical of a battery having such a configuration, the outer case is provided with a case main body having an opening and with a lid that is welded (typically laser welded) to this opening. Patent Literature 1 is an example of the technical literature concerned with batteries of this type.

CITATION LIST

Patent Literature

Patent Literature 1: Japanese Patent Application Laid-open No. 2010-282847

SUMMARY OF INVENTION

As shown in FIG. 15, in the battery disclosed in Patent Literature 1 a terminal 40 is led out from a through hole (terminal exit aperture) 242 in a lid 22 and this terminal 40 is insulated from an outer surface 22A of the lid 22 by separation therebetween by an outside resin member 60. A seam (i.e., a weld) 25 between a case main body 21 and the lid 22 is disposed at a side of the lid 22 (side surface of the case main body 21).

When this seam 25 is made with the outer surface 22A side of the lid 22 as shown in FIG. 3, laser welding can be performed from one direction (the outer surface 22A side of the lid; the upper side of the figure in FIG. 3). This is an advantage in terms of improving, for example, the productivity in battery production. However, the present inventors found that with a battery that has a structure in which the outside resin member 60 is disposed on the lid as shown in FIG. 3, problems can be produced when welding is carried out by irradiating a laser onto the seam 25 present in the outer surface 22A side of the lid, such as, for example, a deterioration in the outside resin member 60 due to its absorption of laser radiation. The present inventors therefore carried out investigations into resins that, when used as the material that forms the outside resin member, would have the ability to withstand this deterioration caused by laser welding (typically a resin that is resistant to the absorption of laser radiation) and specifically carried out investigations into the use of compositions based on nonaromatic resins (nonaromatic resin compositions) such as polyamide resins, e.g., Nylon 66 (registered trademark).

However, while an outside resin member comprising a nonaromatic resin composition can effectively stop the aforementioned deterioration, nonaromatic resins generally tend to have a lower heat resistance and a lower strength than aromatic resins. Due to this, when the seam between the lid and case main body is welded by exposure to a laser, problems can occur due to the thermal input, for example, the outside resin member may undergo deformation (set).

The present invention was pursued considering these points and—with respect to a sealed battery (typically a secondary battery) in which a terminal is withdrawn from a terminal exit aperture in the lid, an outside resin member is present that separates the lid from the withdrawn terminal, and the lid has been laser welded to the case main body from the outer surface side of the lid—the main object of the present invention is to prevent deterioration in the outside resin member and to prevent the problems associated with the formation of the outside resin member from a nonaromatic resin composition (for example, heat distortion during laser welding).

The sealed battery provided by the present invention has a case main body that has an opening, an electrode assembly that is housed in the case main body, a lid that is fixed to the opening in the case main body and that has an outer surface in which a through hole (terminal exit aperture) is disposed, a terminal that is electrically connected to the electrode assembly, and an outside resin member that is disposed on the outer surface of the lid outside the battery. A portion of the terminal passes through the through hole (terminal exit aperture) and is thereby exposed to the outside of the battery. The outside resin member covers a circumference of the portion of the terminal that is exposed to the outside. The lid is fitted into the opening of the case main body such that the edge of the lid outer surface, on which the outside resin member is disposed, and the rim of the opening in the case main body are aligned to be in contact with each other, and the lid is fixed to the case main body by executing laser welding on the resultant seam. In other words, the seam between the lid and the case main body is at the outer surface side of the lid and this seam is laser welded. The outside resin member is formed from a resin matrix containing a nonaromatic resin composition and an inorganic fiber present dispersed in the resin matrix. At least 50% by mass of the inorganic fiber in the outside resin member is disposed such that the fiber axial direction of the inorganic fibers is parallel to the lid.

This "parallel to" encompasses both perfectly parallel and, insofar as the effects of the invention are achieved, cases which can be regarded as substantially parallel. The angle of intersection between the inorganic fiber and the outer surface of the lid is typically from 0° to 30°.

Unlike an outside resin member comprising an aromatic resin composition, e.g., of a polyphenylene sulfide resin (PPS), the use of such an outside resin member formed from a nonaromatic resin composition can prevent the laser welding-induced deterioration of the outside resin member. In addition, by dispersing the inorganic fiber oriented in a prescribed direction in the resin matrix comprising a nonaromatic resin composition, the decline in heat resistance and mechanical strength associated with formation of the outside resin member using a nonaromatic resin composition can be compensated. This can prevent the heat distortion (set) of the outside resin member that can occur, for example, when the seam between the lid and case main body is laser welded.

The inorganic fiber here refers to a fibrous member constituted of an inorganic material. Suitable examples of the inorganic fiber are glass fiber, ceramic fiber, carbon fiber, and metal fiber. The inorganic fiber is glass fiber in a preferred aspect. Glass fiber can effectively contribute to increasing the heat resistance and mechanical strength of nonaromatic resins.

In a preferred aspect of the herein disclosed sealed battery, the content of the inorganic fiber in the outside resin member is 45% by mass to 60% by mass with reference to the total mass of the outside resin member. When the inorganic fiber content is in the indicated range, the heat resistance and mechanical strength can be effectively reinforced while maintaining the moldability of the outside resin member. In another preferred aspect, the average fiber diameter of the inorganic fiber is 3 µm to 50 µm. The heat resistance and mechanical strength can be effectively reinforced by using inorganic fiber that has such a fiber diameter.

In a preferred aspect of the herein disclosed sealed battery, the outside resin member has a through hole through which the terminal is inserted. The terminal has a base part that is disposed in the interior of the battery and has a rivet part that extends from the base part, passes through the through hole (terminal exit aperture) in the lid and the through hole in the outside resin member, and is led out (exposed) to the outside of the battery. The rivet part of the terminal is crimped so as to compress the outside resin member in the direction of the axis of the terminal. In a battery with this configuration, deformation of the lid (typically warping) tends to be caused by the crimping stress. However, this lid deformation is inhibited in the present aspect because the inorganic fibers in the outside resin member have been oriented in parallel to the lid.

In a preferred aspect of the herein disclosed sealed battery, the battery is further provided with a bolt that has a head part and a leg part and that is disposed such that the leg part is inserted into a bolt insertion hole that is provided in an outside terminal part of the terminal. The outside resin member has an extension part that extends along the outside terminal part of the terminal. In addition, a bolt receiving hole that receives the head part of the bolt and limits bolt rotation, is formed in the extension part of the outside resin member. In a battery with this configuration, there is a risk that the outside resin member might crack due to the fastening pressure (torque) when the bolt is engaged; however, cracking by the outside resin member is suppressed in accordance with the structure of the present invention because the inorganic fibers in the outside resin member are oriented parallel to the lid.

In a preferred aspect of the herein disclosed sealed battery, the opening in the case main body is formed in a rectangular shape and the lid has a pair of long sides and a pair of short sides that conform to the rectangular shape of this opening. In addition, at least 50% by mass of the inorganic fiber in the outside resin member is disposed such that the fiber axial direction of the inorganic fibers is parallel to the long side of the lid. This structure makes it possible to ensure a large space for elongation for the outside resin member. This "parallel to" encompasses both perfectly parallel and, insofar as the effects of the invention are achieved, cases which can be regarded as substantially parallel. The angle of intersection between the inorganic fiber and the long side of the lid is typically from 0° to 30°.

In a preferred aspect of the herein disclosed sealed battery, the outside resin member characteristically does not contain a phenolic heat stabilizer and does not contain a Cu—I-based heat stabilizer. A phenolic heat stabilizer can cause deterioration due to its absorption of scattered laser light during laser welding. A Cu—I-based heat stabilizer can elute to the outside together with water absorbed by the outside resin member and can then cause corrosion of other constituent members of the battery (for example, the terminals and case main body). Since, in accordance with the structure of the present invention, these heat stabilizers are not present in the outside resin member, corrosion of the other constituent members of the battery can be avoided in combination with reliably and securely preventing deterioration of the outside resin member.

In a preferred aspect of the herein disclosed sealed battery, at least 80% by mass of the nonaromatic resin composition is at least one selection from Nylon 6 (registered trademark), Nylon 66 (registered trademark), other polyamides (PA), polyacetals, tetrafluoroethylene-perfluoroalkoxy vinyl ether resins, and polymethyl methacrylates. These resin materials are highly resistant to laser welding-induced deterioration (they are typically poor absorbers of the scattered laser light) and as a consequence are preferred as nonaromatic resins adapted to the objects of the present invention.

The present invention also provides a battery pack having any of the herein disclosed batteries as a unit cell and having a plurality of these unit cells. The terminal-to-terminal connection of these unit cells is done through a connection member. In a preferred aspect, the unit cell is a bolt-equipped sealed battery as described above and the connection member is fastened to the outside terminal part of the terminal by passing the leg part of the bolt through a bolt insertion hole in the connection member and fastening a nut to the bolt. A battery pack with this configuration exhibits an excellent quality because the deterioration and deformation of the outside resin member are prevented and in addition exhibits a low unit cell-to-unit cell connection resistance because a mechanical strength that can resist the bolt fastening pressure can be secured.

In this Description, "secondary battery" is a concept that encompasses so-called storage batteries such as lithium ion secondary batteries, metal lithium secondary batteries, nickel hydride batteries, nickel-cadmium batteries, and so forth, and that also encompasses storage devices such as electric double-layer capacitors. In addition, a "nonaqueous electrolyte secondary battery" refers to a battery that is provided with a nonaqueous electrolyte (typically an electrolyte that contains a supporting salt (supporting electrolyte) in a nonaqueous solvent). A "lithium secondary battery" refers to a secondary battery that uses the lithium ion as the electrolyte ion and that engages in charge/discharge through the migration of the lithium ion between positive and negative electrodes. The secondary battery generally known as the lithium ion battery is a typical example encompassed by such lithium secondary batteries. The herein disclosed art is typically applied to sealed nonaqueous electrolyte secondary batteries (for example, lithium ion secondary batteries).

All of the herein disclosed sealed batteries (for example, lithium ion secondary batteries) can be favorably used, typically in a battery pack configuration, as a power source installed in a vehicle. For example, they are advantageous as a power source (typically a drive power source) for a motor installed in a vehicle, e.g., an electric motor-equipped automobile such as a hybrid automobile or an electric automobile. The present invention therefore provides a vehicle (for example, an automobile) that is equipped with any of the herein disclosed sealed batteries (this can be a battery pack configuration).

DESCRIPTION OF EMBODIMENTS

Preferred embodiments of the present invention are described in the following. Matters required for the execution of the present invention but not particularly described in this Description can be understood as design matters for the individual skilled in the art based on the conventional art in the pertinent field. The present invention can be executed based on the contents disclosed in this Description and the common general technical knowledge in the pertinent field.

While not intended as a particular limitation, the present invention is more particularly described in the following using as an example the application of the present invention mainly to a lithium ion secondary battery that is provided with a flat, rectangular outer case. In the following description of the drawings, members and positions that exercise the same function are assigned the same reference number and some duplicate descriptions thereof have been omitted. The dimensional relationships (length, width, thickness, and so forth) in the individual figures do not necessarily reflect actual dimensional relationships.

Figure 1:
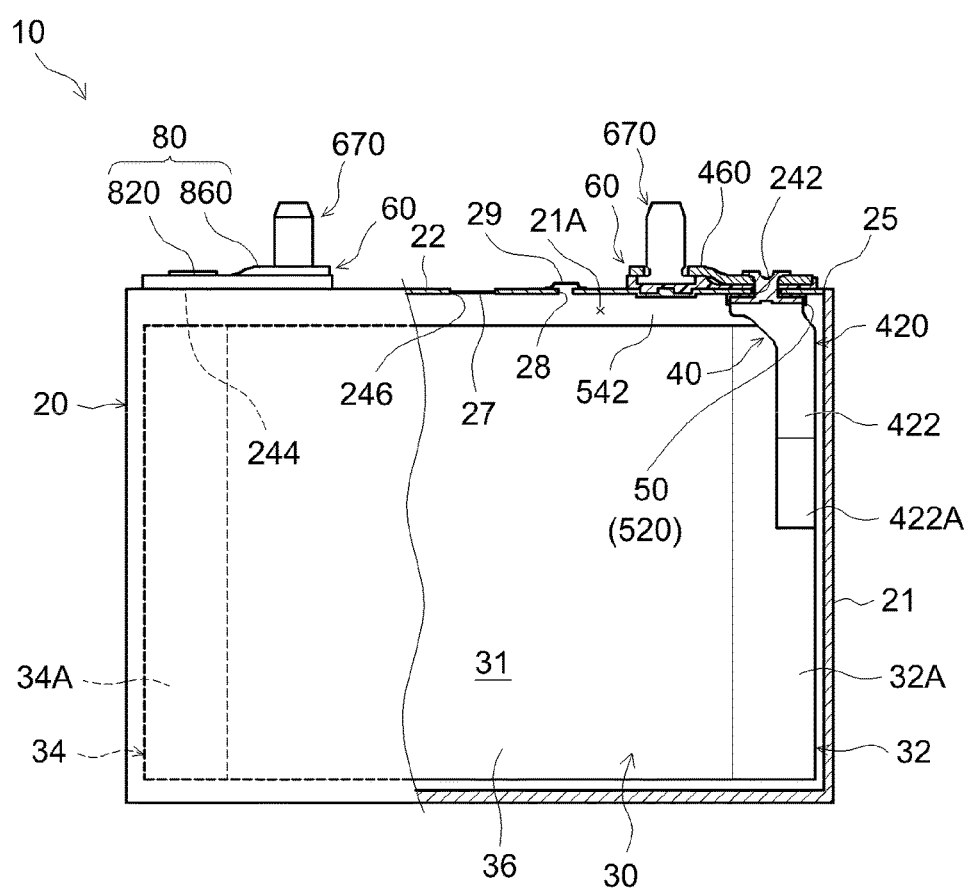
FIG. 1 is a partial cross-sectional view that shows a sealed battery according to an embodiment.
Figure 2:
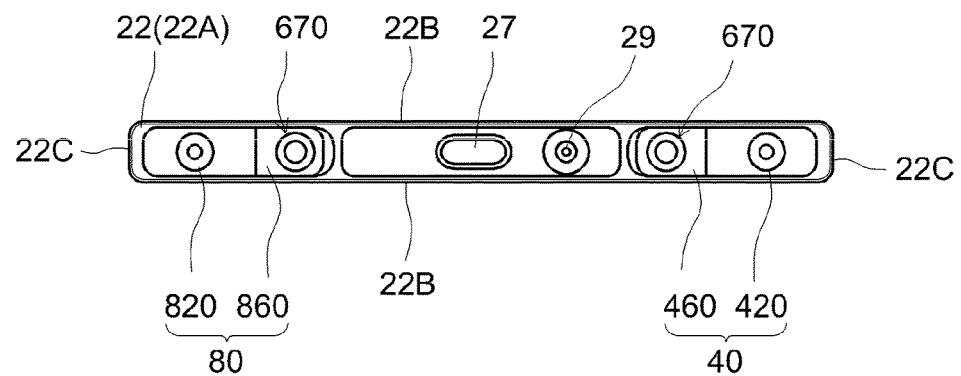
FIG. 2 is a plan view that shows a sealed battery according to an embodiment.
Figure 3:
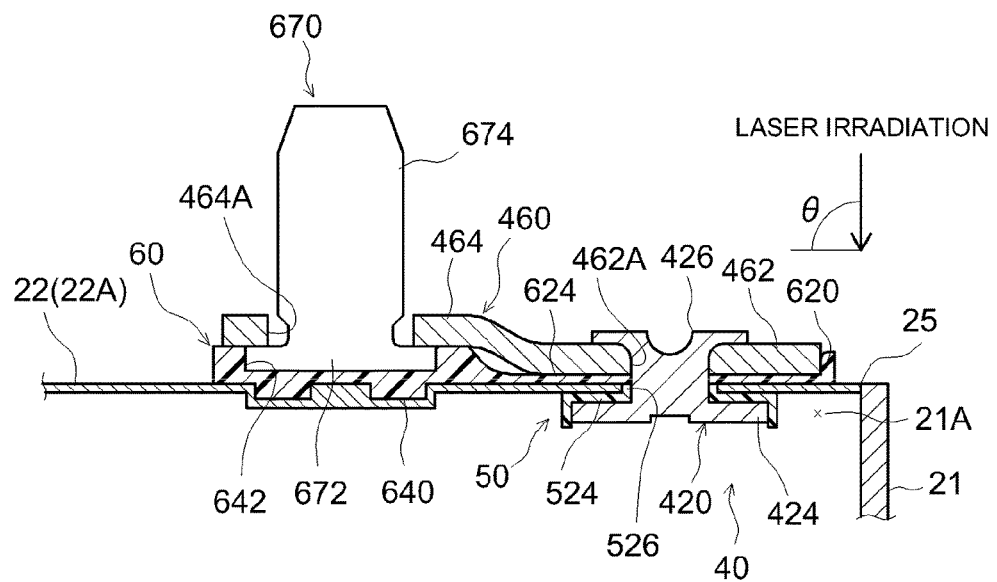
FIG. 3 is a cross-sectional diagram that shows a portion of FIG. 1 in an enlarged view.

As shown in FIGS. 1 to 3, the lithium ion secondary battery 10 according to the present embodiment has a structure in which a wound electrode assembly 30—which is provided with prescribed battery constituent materials (a separator, sheet-shaped electrodes in which a positive or negative electrode active material is supported, respectively, on a positive electrode or negative electrode current collector, and so forth)—is housed along with a suitable electrolyte solution (not shown) in a flat, rectangular parallelepiped-shaped (i.e., rectangular) outer case 20.

<The Outer Case>

The outer case 20 is provided with a box-shaped case main body 21 (i.e., a rectangular tube having a bottom) in which one of the narrow faces of the flat, rectangular parallelepiped shape forms an opening 21A, and is also provided with a lid 22 that closes this opening 21A. In this embodiment, the opening in the case main body 21 is formed in a rectangular shape and the lid 22 has a pair of long sides 22B (FIG. 2) and a pair of short sides 22C (FIG. 2) that correspond to the rectangular shape of the opening. The lid 22 is fitted into the opening 21A of the case main body 21 such that the edge of the outer surface 22A of the lid 22 and the rim of the opening 21A in the case main body 21 are aligned to be in contact with each other. The lid 22 is fixed to the main body 21 by executing laser welding on the resultant seam 25. As shown in FIG. 3, this laser weld is executed by exposure to laser light from a direction that is not parallel to the outer surface 22A of the lid (i.e., a direction that intersects with the outer surface 22A, typically above the seam 25 (upper side in FIG. 3)). The angle θ made between the direction of laser exposure and the outer surface 22A of the lid is typically about 60° to 120° and is generally suitably about 75° to 105° (for example, 75° to 90°). When θ is too small, the laser light may be blocked by the outside resin member 60 and may then not freely strike the seam 25. When θ is too large, this is unfavorable because heating of the outside resin member 60 may then readily occur due to, for example, reflected light from the laser irradiation.

Insofar as the seam (weld) 25 between the main body 21 and the lid 22 can be joined by welding, the same materials as used for common lithium ion secondary batteries can be used as appropriate as the material constituting the case 20. Viewed from the standpoint of heat dissipation and so forth, a case 20 can be advantageously used in which almost all of the main body 21 and the lid 22 is made of a metal (for example, aluminum, stainless steel (SUS), steel, and so forth). The herein disclosed art can be advantageously applied to batteries (for example, lithium ion secondary batteries) in which almost all of the main body 21 and the lid 22 is made of aluminum. Aluminum tends to require larger amounts of energy for laser welding because it has a higher thermal conductivity (more easily dissipates heat) than, for example, SUS; however, the herein disclosed art can effectively prevent the deterioration and deformation of the outside resin member even for a melting regime in which such large amounts of energy are applied. Thus, both the main body 21 and the lid 22 may be made of aluminum in the battery 10 according to the present embodiment.

Figure 5:
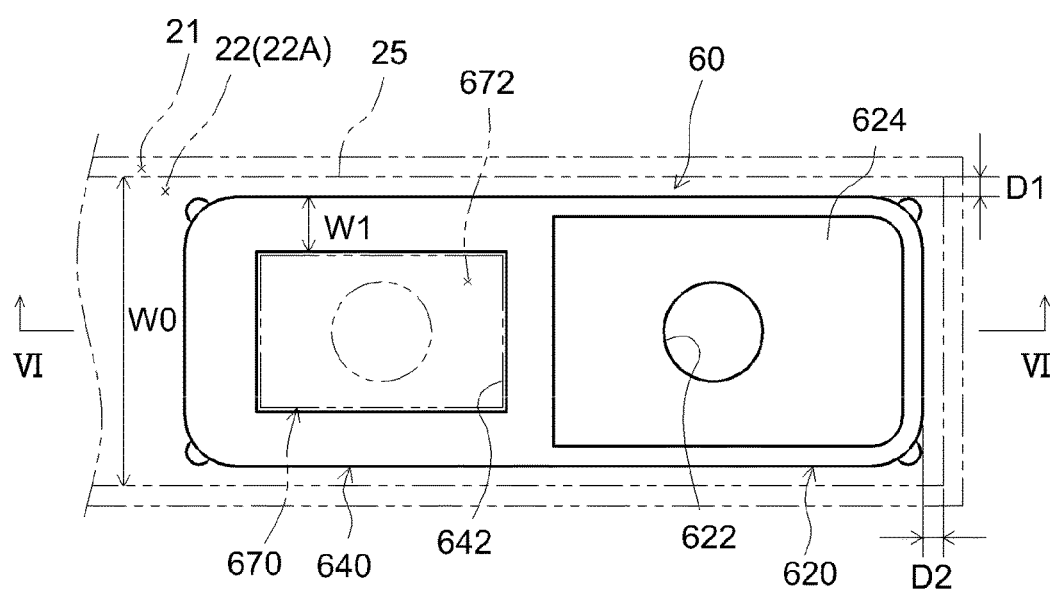
FIG. 5 is a plan view that shows the outside resin member according to an embodiment.
Figure 7:
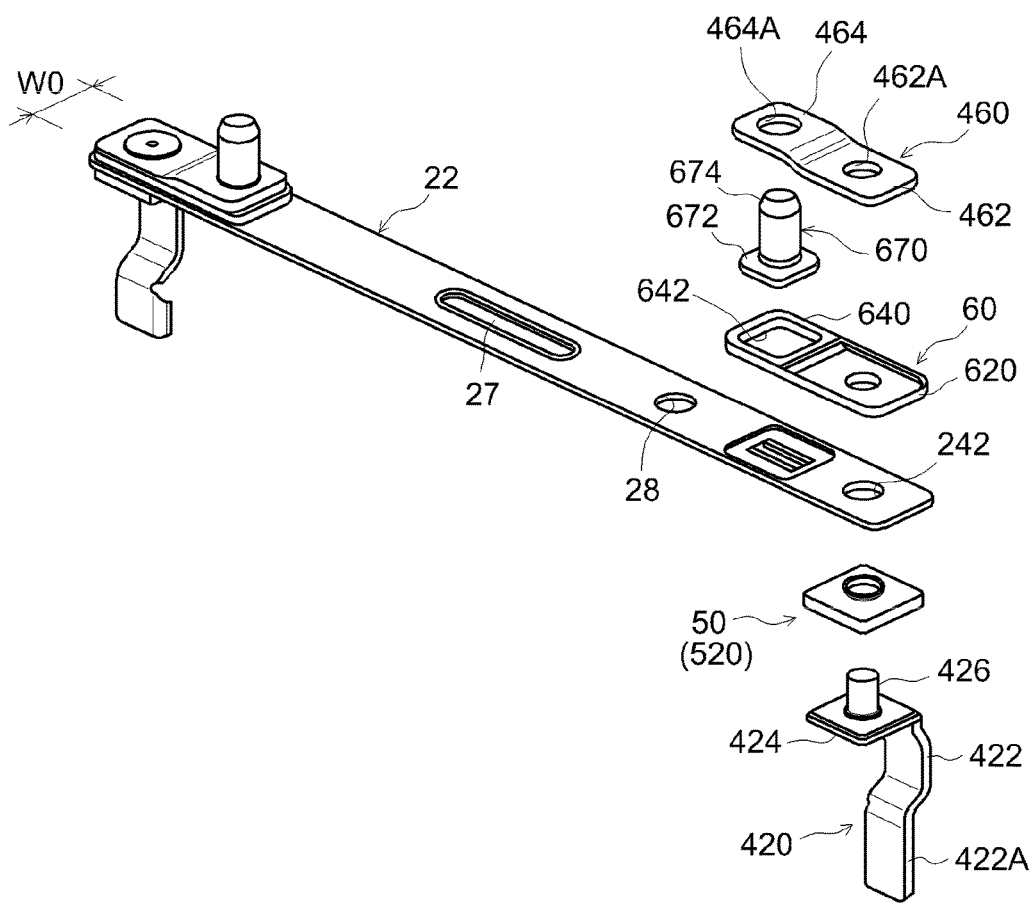
FIG. 7 is an exploded perspective diagram that shows the lid and terminal of a sealed battery according to an embodiment.

The outer shape of the lid 22 is an approximately rectangular shape that conforms to the shape of the opening 21A (the shape of the opening in the main body 21). The herein disclosed art can be advantageously applied to a battery in which, for example, the width of the lid 22 (the length of the short side in the aforementioned approximately rectangular shape; refer to FIG. 5 and FIG. 7) W0 is approximately 10 mm to 28 mm (preferably 10 mm to 15 mm). In the case of a battery with such a relatively narrow width W0 for the lid 22, the distance D1 (refer to FIG. 5) from the outer edge of the outside resin member 60 to the seam (weld) 25 considered in the width direction of the lid 22 tends to be short. Accordingly, the prevention of deterioration and deformation of the outside resin member 60 by the application of the herein disclosed art is of particular significance here. The lid 22 in the present embodiment has a rectangular shape having a width (W0) of 12.5 mm and a length of 136 mm.

While not a particular limitation, the thickness (sheet thickness) of the lid 22 can be, for example, about 0.3 mm to 2 mm (typically about 0.5 mm to 2 mm). The thickness of the lid 22 may be from 0.5 mm to less than 1 mm. In addition, the thickness (sheet thickness) of the main body 21 can be, for example, about 0.5 mm to 3 mm and is typically 1 mm to 3 mm. In the battery 10 according to the present embodiment, the sheet thickness of the aluminum material constituting the main body 21 is 0.4 mm and the sheet thickness of the aluminum material constituting the lid 22 is 0.7 mm to 1.4 mm.

<The Wound Electrode Assembly>

The wound electrode assembly 30 is housed in the case main body 21 in a configuration in which its axis is turned sideways (i.e., the direction whereby the opening is positioned transverse to the winding axis). A positive electrode terminal 40 and a negative electrode terminal 80 are respectively connected at the two ends of the winding axis of this electrode assembly 30. These electrode terminals 40, 80 pass through, respectively, a positive electrode terminal exit aperture (through hole) 242 and a negative electrode terminal exit aperture (through hole) 244, which are disposed at the first end and the second end of the lid 22 considered in its length direction, and are thus led out from the inside of the outer case 20 to the outside. That is, in the present embodiment the positive and negative electrode terminals 40, 80 are led to the outside from the lid 22, which itself forms one (the terminal exit surface) of the narrow faces of the flat, rectangular outer case 20. These electrode terminals 40, 80 are electrically connected to the wound electrode assembly 30 and a portion of each passes through the terminal exit aperture 242, 244, respectively, of the lid 22 and is thereby exposed to the outside of the battery. In this embodiment, the electrode terminals 40, 80 are provided with an inner terminal 420, 820 and an outer terminal 460, 860. More particularly, as shown in FIGS. 1 to 3, the positive electrode terminal 40 has a structure in which the positive electrode inner terminal 420, which is located mainly inside the case 20, is connected to the positive electrode outer terminal 460, which is located mainly outside the case 20. The negative electrode terminal 80 also has a structure in which the negative electrode inner terminal 820 and the negative electrode outer terminal 860, which are formed with approximately the same shapes as on the positive electrode side, are connected to each other (refer to FIG. 1).

There is disposed in the lid (terminal exit surface) 22—between the terminal exit apertures 242 and 244 (in the present embodiment, approximately in the center considered in the long direction of the terminal exit surface 22)—a safety valve 27 in order, when the internal pressure in the case 20 rises, to cause the interior of the case to communicate with the outside and release the internal pressure. The safety valve 27 in the present embodiment is formed mainly of a metal (for example, aluminum) sheet that is attached so as to close an opening 246 in the lid 22 and can release the internal pressure when a linear (for example, a shape in which the lower ends of two Y-shapes face each other) thin-walled part provided in the sheet is acted upon by the internal pressure in the case and is thereby ruptured.

The wound electrode assembly 30 can be fabricated, in the same manner as for the wound electrode assembly of an ordinary lithium ion secondary battery, by stacking a sheet-shaped positive electrode (positive electrode sheet) 32 and a sheet-shaped negative electrode (negative electrode sheet) 34 along with a total of two sheets of a sheet-shaped separator (separator sheet) 36; winding in the long direction; and flattening the obtained winding by pressing it from the side direction. Winding is performed on a stacked configuration in which the positions of the positive electrode sheet 32 and the negative electrode sheet 34 are shifted somewhat in the width direction so that one edge of the sheet 32 and one edge of the sheet 34 considered in the width direction extend out beyond, respectively, the first edge and the second edge of the separator sheet 36 considered in the width direction. This results in the formation, respectively at the edge on the first side and at the edge on the second side of the wound electrode assembly 30 considered in the direction of its winding axis, of a region (the positive electrode sheet extension region) 32A in which an edge considered in the width direction of the positive electrode sheet 32 extends outward from the wound core region 31 (i.e., the region where the positive electrode sheet 32, the negative electrode sheet 34, and the separator sheet 36 are densely wound) and a region (the negative electrode sheet extension region) 34A in which an edge considered in the width direction of the negative electrode sheet 34 extends outward from the wound core region 31. These extension regions 32A, 34A typically form regions that do not carry the electrode active material (active material layer-free region).

<The Electrode Terminal>

For the positive electrode sheet, the lower end 422A of the positive electrode inner terminal 420 is connected, for example, by ultrasound welding, to the extension region 32A. This inner terminal 420 is provided with the following: a sheet-shaped (strip-shaped) lead part 422 that extends from the lower end 422A approximately vertically with respect to the lid 22; a sheet-shaped base part 424 that is formed continuing from the upper end of the lead part, that is bent at an approximately right angle (from the front side to the back side of the figure in FIG. 3) from this upper end, and that spreads out approximately parallel to the inner surface of the lid 22; and a projecting part 426 that projects from the center of the sheet surface of a second lead part and that extends approximately vertically out from the battery. In the present embodiment the projecting part 426 is constructed to be the rivet part. This rivet part (for example, having an approximately cylindrical shape) 426 passes through the terminal exit aperture 242 and the through hole (rivet hole) 462A in the outer terminal 460, and the inner terminal 420 and the outer terminal 460 are then connected (fastened) by riveting (crimping). Metals having a good conductivity are preferred for the constituent material of the inner terminal 420 and the outer terminal 460 on the positive electrode side, and aluminum is typically used. The positive electrode inner terminal 420 and the positive electrode outer terminal 460 in the present embodiment are made of aluminum.

The positive electrode outer terminal 460, on the other hand, has a first connecting part 462, which has a through hole 462A through which the projecting part 426 can be inserted prior to the aforementioned riveting, and has a second connecting part 464 (which corresponds to the outside terminal part of the positive electrode outer terminal 460), which continues from this first connecting part along the long direction of the lid 22 toward its middle (i.e., toward the safety valve) and is formed with a stepped elevation ascending outward from the case 20. As is clearly shown in FIG. 7, a bolt insertion hole 464A, through which the leg part 674 of the bolt 670 can be inserted, is formed in the second connecting part 464. A connection member 112 for external connection (for example, to the terminal of another battery or to an exterior circuit) can be connected (fixed) to the outer terminal 460 by passing the leg part 674 of the bolt up through the bolt insertion hole 464A, mounting the connection member 112 on the leg part 674 projecting upward from the second connecting part 464, and fastening with a nut 113 (refer to FIGS. 9 and 10).

The aforementioned riveting is carried out with an inside resin member 50 sandwiched between the base part 424 and the wall surface of the lid 22 that encircles the terminal exit aperture 242 and with the outside resin member 60 sandwiched between this wall surface and the first connecting part 462 of the outer terminal. This riveting functions to compress the outside resin member 60 between the lid 22 and the first connecting part 462 and also to fix the positive electrode terminal 40 to the lid 22. This riveting also functions to compress the inside resin member 50 between the lid 22 and the base part 424, thereby sealing the terminal exit aperture 242.

<The Inside Resin Member>

Figure 4:
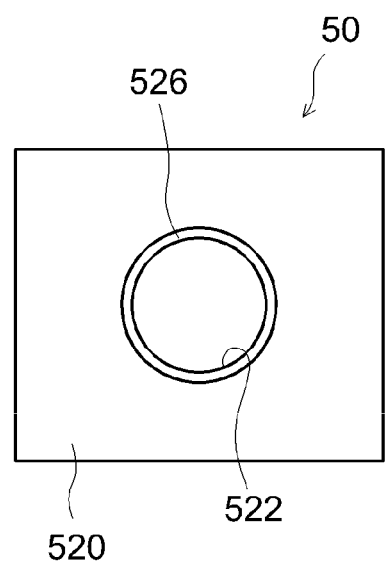
FIG. 4 is a plan view that shows an inside resin member according to an embodiment.

The structure and function of the inside resin member 50 are particularly described in the following. This inside resin member 50 has a mounting part 520, which is provided with an opening 522 (refer to FIG. 4) through which the rivet part (projecting part) 426 of the inner terminal 420 is inserted. The mounting part 520, through the compression of the portion surrounding the opening 522 with it being sandwiched between the lid 22 and the base part 424, functions to insulate the inner terminal 420 (the base part 424) from the lid 22 and also to seal the terminal exit aperture 242. The mounting part 520 has a cylindrical part 526 that is inserted from the inside into the terminal exit aperture 242 and that prevents (insulates) direct contact between the rivet part 426 and the lid 22. A recess 524 capable of receiving the base part 424 of the inner terminal 420 from below (i.e., the interior of the case) is formed on the underside (the surface on the side of the electrode assembly) of the mounting part 520. This recess 524 is formed so that the lower end surface of the base part 424 fits within the recess 524. As a consequence, direct contact between the periphery of the electrode assembly 30 and the base part 424 (particularly its outer edge, i.e., its edge region) can be suppressed and damage to the electrode assembly 30 caused by this contact can be avoided. In addition, by covering the outer edges of the base part 424 in three directions excepting the lid center side with the outer peripheral walls of the recess 524, insulation between the inner terminal 420 (the base part 424) and the case main body 21 can be more reliably executed.

<The Outside Resin Member>

Figure 6:
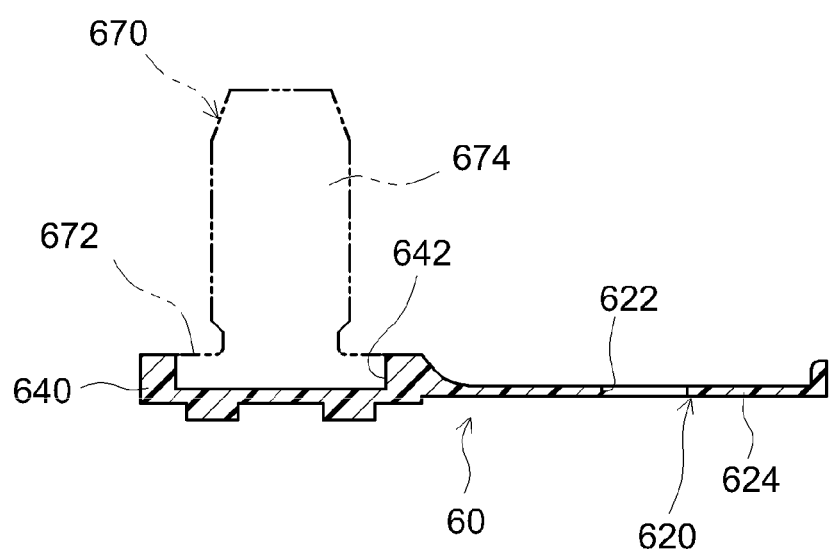
FIG. 6 is a side view that shows the outside resin member according to an embodiment.

The structure and function of the outside resin member 60 are particularly described in the following. The outside resin member 60 is a member that is disposed at the outer surface 22A located outside the battery of the lid 22 and that covers the circumference of the portion of the terminal that is exposed on the outside. In this embodiment, the outside resin member 60 has a mounting part 620 sandwiched between the outer surface of the lid 22 (the upper side of the flat sheet-shaped lid 22) and the first connecting part 462 of the outer terminal, and has an extension part 640 that extends between the second connecting part 464 of the outer terminal and the lid 22. The mounting part 620 has a through hole 622 (refer to FIGS. 5 and 6) positioned to conform to the terminal exit aperture 242 of the lid 22. This through hole 622 has an inner diameter of a size sufficient to accommodate the rivet part 426 of the positive electrode inner terminal 420. In addition, the mounting part 620 has a plate part 624 that extends along the outer surface of the lid 22. The first connecting part 462 of the outer terminal is disposed conforming to a recess in this plate part 624. Through the riveting of the rivet part 426, the portion of the mounting part 620 surrounding the through hole 622 is compressed along the axial direction of the terminal while being sandwiched between the lid 22 and the first connecting part 462.

A bolt receiving hole 642, which has the shape of a rectangular opening for which the long side is the long direction of the outside resin member 60 (agrees with the long direction of the lid 22), is formed in the extension part 640. The secondary battery 10 according to the present embodiment is constructed to contain a bolt 670 that has a limited rotation (co-rotation is prevented) due to the insertion of the head part 672 in the bolt receiving hole 642 and that is located (installed) with the leg part 674 projecting out through the bolt insertion hole 464A.

<The Nonaromatic Resin Composition>

The outside resin member 60 is formed by a nonaromatic resin composition, i.e., a composition that is based on a nonaromatic resin. Here, the nonaromatic resin refers to a resin that does not contain an aromatic ring (typically the benzene ring), and preferred specific examples thereof are aliphatic polyamides (e.g., Nylon 6 (registered trademark) (PA6), Nylon 66 (registered trademark) (PA66), and so forth), polyacetals (POM), tetrafluoroethylene-perfluoroalkoxy vinyl ethers (PFA), and methacrylic resins (typically polymethyl methacrylate (PMMA)). The nonaromatic resin composition may contain any one of these nonaromatic resins or may contain two or more. The use is preferred of a resin composition that has a heat resistance temperature, based on measurement of the heat deflection temperature (0.45 MPa), of at least 150° C. (more preferably at least 250° C.). The outside resin member 60 according to the present embodiment is constituted of any one of PA66, POM, PFA, and PMMA.

By using an outside resin member 60 of such a material, the laser welding-induced deterioration of the outside resin member 60 can be effectively stopped even for a battery with a configuration in which, when a conventional PPS-based outside resin member is used, this resin member undergoes deterioration due to the laser welding of the seam 25 between the lid 22 and the case main body 21. Accordingly, a higher quality battery can be produced at better productivities.

The herein disclosed art can be advantageously applied to batteries in which the minimum distance from the outer edge of the outside resin member 60 to the weld (the seam 25 between the lid 22 and the main body 21) is not more than 5 mm (for example, not more than 3 mm). The effects from its application are particularly substantial in batteries in which this distance is not more than 2 mm (for example, 0.5 to 2 mm). In the present embodiment, the distance D1 from the outer edge of the outside resin member 60 to the weld 25 considered in the width direction of the lid 22 is 1 mm. In addition, the distance D2 from the outer edge of the outside resin member 60 to the weld seam 25 considered in the long direction of the lid 22 is 2.8 mm. The effects from the application of the herein disclosed art are exhibited particularly well in the case of a battery fabricated (welded) in a configuration in which the minimum distances between the track of the laser light and the outside resin member 60 are in the indicated numerical value ranges.

The content $C_{NA}$ of the nonaromatic resin in the nonaromatic resin composition is typically at least 70% by mass (i.e., $C_{NA} \geq 70\%$ by mass) and is preferably $C_{NA} \geq 80\%$ by mass (typically $C_{NA} > 80\%$ by mass and more preferably $C_{NA} \geq 90\%$ by mass). Stated differently, the content $C_{AR}$ of aromatic resin in the nonaromatic resin composition is typically not more than 30% by mass (i.e., $C_{AR} \leq 30\%$ by mass) and is preferably $C_{AR} \leq 20\%$ by mass and more preferably $C_{AR} \leq 10\%$ by mass. $C_{AR}$ may also be $\leq 5\%$ by mass. When $C_{AR}$ is too large, the appearance of an adequate deterioration-preventing effect may be impaired. In a preferred aspect, the outside resin member 60 is formed from a nonaromatic resin composition that substantially does not contain aromatic resin. For example, an outside resin member is preferred that is formed from a nonaromatic resin composition that does not exhibit a peak assigned to the benzene ring in the infrared (IR) spectrum obtained by spectroscopic measurement.

The type of resin present in the resin composition that constitutes the outside resin member 60 can be determined using common analytical procedures, e.g., IR spectroscopic analysis as noted above, pyrolysis gas chromatography, and so forth, as necessary in combinations thereof. In addition, when the resin composition constituting the outside resin member 60 contains a plurality of resins, the blending proportions for these resins can be accessed through the results of these analyses and the specific gravity of the outside resin member.

The nonaromatic resins as described above tend to have a lower heat resistance and a lower mechanical strength than aromatic resins. Due to this, when the seam 25 between the lid 22 and the case main body 21 is welded by exposure to a laser, the risk arises that defects will be produced—for example, heat distortion (set) of the outside resin member 60 when the outside resin member 60 is heated by the thermal inputs. In order to compensate for the reduction in heat resistance and mechanical strength associated with formation of the outside resin member 60 from a nonaromatic resin composition, in the present embodiment the inorganic fibers are therefore dispersed oriented in a prescribed direction in the resin matrix comprising the nonaromatic resin composition.

Figure 8:
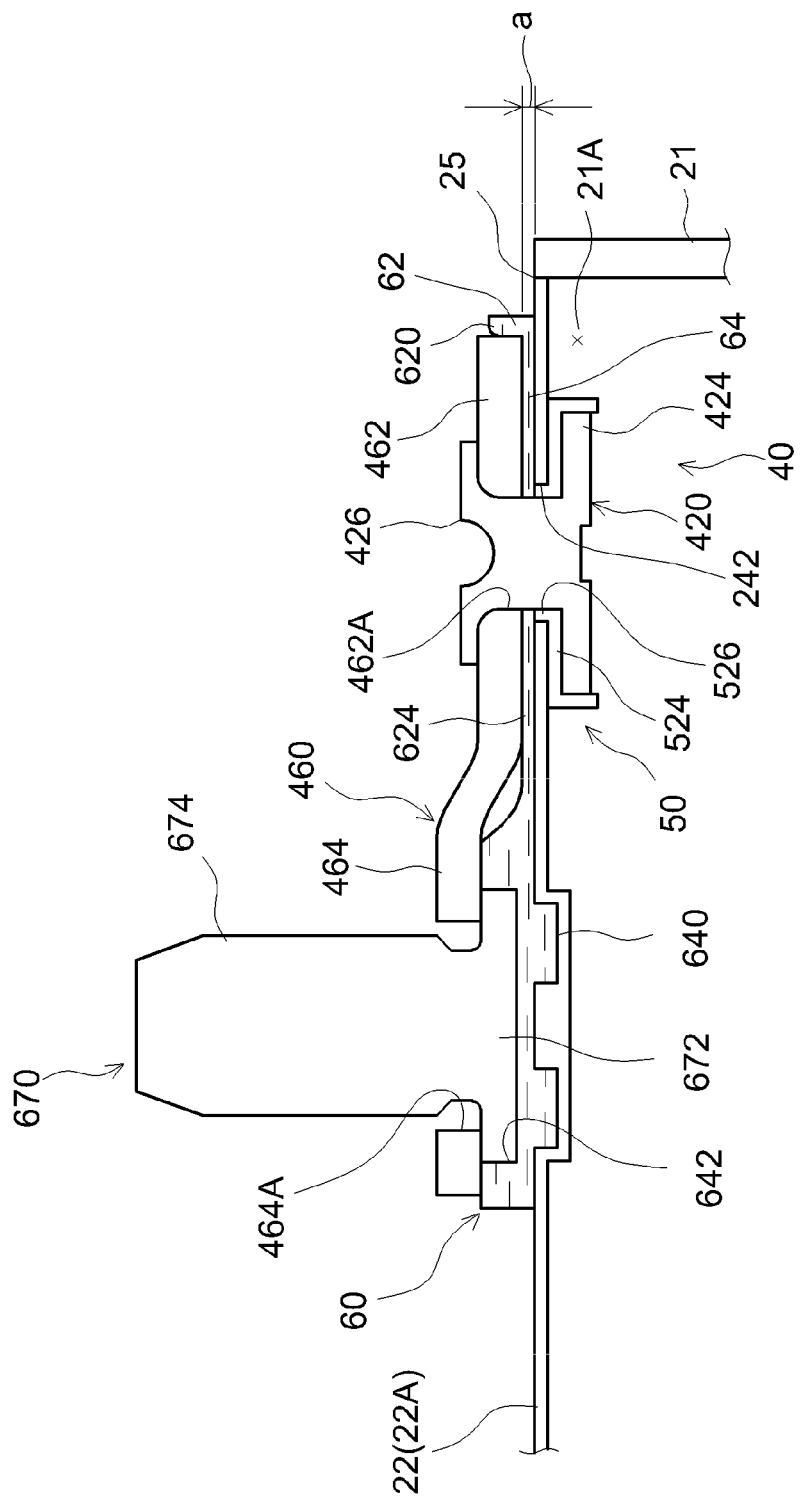
FIG. 8 is a cross-sectional diagram that shows a portion of FIG. 1 in an enlarged view.

Specifically, and as shown in FIG. 8, the outside resin member 60 in the herein disclosed sealed battery 10 is formed from a resin matrix 62 comprising a nonaromatic resin composition and an inorganic fiber 64 present dispersed in the resin matrix 62. In addition, at least 50% by mass of the inorganic fiber 64 in the outside resin member 60 is disposed so that the fiber axial direction of the inorganic fiber 64 is parallel to the outer surface 22A of the lid 22.

<The Inorganic Fiber>

The inorganic fiber 64 dispersed in the resin matrix 62 should be a fibrous member constituted of an inorganic material, but is not otherwise particularly limited within the range in which the effects of the present application can be exhibited, and a single type of inorganic fiber or two or more types can be used as appropriate. For example, the inorganic fiber 64 may be a glass fiber. The glass fiber can be exemplified by glass fiber in which the main component is $SiO_2$. The $SiO_2$ main component may be used mixed with a carbide or oxide, e.g., $Al_2O_3$, $TiO_2$, CaO, MgO, $B_2O_3$, $Li_2O$, $ZrO_2$, BaO, $B_2C_3$, $Na_2O$, $K_2O$, and so forth. A specific example of a more preferred glass fiber in the herein disclosed art is a glass fiber having the composition of $SiO_2$. Glass fiber can effectively contribute to improving the heat resistance and mechanical strength of the nonaromatic resin composition. In addition, glass fiber, because it has an insulating character, is also preferred from the standpoint of ensuring the insulating character of the outside resin member 60.

Or, the inorganic fiber 64 may be an inorganic material other than a glass, for example, a ceramic fiber, carbon fiber, or metal fiber. The ceramic fiber can be exemplified by fiber synthesized using alumina and silica as the main components. The metal fiber can be exemplified by stainless steel fiber, aluminum fiber, nickel fiber, and copper fiber. The carbon fiber can be exemplified by PAN-based carbon fiber and pitch-based carbon fiber. A single one of these inorganic fibers may be used by itself or appropriate combinations may be used.

The average fiber diameter (number-average) of the inorganic fiber 64 dispersed in the resin matrix 62 is not particularly limited, but is ordinarily at least 3 μm and is preferably at least 5 μm. When the fiber diameter of the inorganic fiber 64 is too small, it may then become difficult for the effects of improving the heat resistance and improving the mechanical strength to appear to a satisfactory degree. On the other hand, an inorganic fiber 64 with an average fiber diameter above 50 μm is unfavorable because this creates the risk of reducing the moldability and mechanical strength of the outside resin member 60. The length (number-average) of the inorganic fiber 64 is not particularly limited, but is ordinarily in the range from 3 μm to 50 μm and is preferably 5 μm to 20 μm. The heat resistance and mechanical strength can be effectively strengthened by using an inorganic fiber 64 having such a size.

In a preferred aspect of the outside resin member 60 used in the herein disclosed sealed battery 10, the content X of the inorganic fiber 64 in the outside resin member 60 is preferably 45% by mass to 60% by mass (i.e., $45 \leq X \leq 60$) with respect to the total mass of the outside resin member 60 (typically the sum total amount of the resin matrix 62 and the inorganic fiber 64). When the content X of the inorganic fiber 64 is too large, the risk exists of a reduction in the moldability due to a reduction in the fluidity of the resin. When, on the other hand, the content of the inorganic fiber 64 is too low, it may then become difficult for the effects of improving the heat resistance and improving the mechanical strength to appear to a satisfactory degree. The content X of the inorganic fiber 64 with respect to the total mass of the outside resin member 60 is generally suitably from 45% by mass to 60% by mass (i.e., $45 \leq X \leq 60$), is preferably suitably from more than 45% by mass to less than 60% by mass (i.e., $45 < X < 60$), is more preferably from 48% by mass to 52% by mass, and is particularly preferably from 50% by mass to 52% by mass.

In the herein disclosed art, at least 50% by mass of the inorganic fiber 64 in the outside resin member 60 is disposed so that its fiber axial direction is parallel to the outer surface 22A of the lid 22. In a preferred aspect, at least 60% by mass (more preferably at least 75% by mass and particularly preferably at least 90% by mass) of the inorganic fiber 64 is disposed to be parallel to the outer surface 22A of the lid 22. This "parallel to" encompasses both perfectly parallel and, insofar as the effects of the invention are achieved, cases which can be regarded as substantially parallel. For example, the angle of intersection between the inorganic fiber 64 and the outer surface 22A of the lid 22 may be from 0° to 30°. The angle of intersection between the inorganic fiber 64 and the outer surface 22A of the lid 22 is preferably 0° or greater and less than 20° and more preferably less than 10°.

The reduction in the heat resistance and mechanical strength associated with the formation of the outside resin member 60 from a nonaromatic resin composition can be compensated for by bringing about the dispersion in the resin matrix 62 of the inorganic fiber 64 thusly oriented in parallel to the lid 22. This in turn can prevent the heat distortion (set) of the outside resin member 60 that can occur, for example, when the seam 25 between the lid 22 and the case main body 21 is laser welded.

In addition, in this embodiment the outside resin member 60 is installed in the peripheral region surrounding the terminal exit aperture 242 of the lid 22 and has a through hole 622 in which the positive electrode inner terminal 420 is inserted. The positive electrode inner terminal 420 has a base part 424 disposed within the battery 10 and has a rivet part 426 that projects from the base part 424, passes through the terminal exit aperture 242 of the lid 22, and exits out to the outside of the battery 10. The rivet part 426 is crimped so as to compress the outside resin member 60 in the direction of the axis of the terminal and the positive electrode inner terminal 420 is thereby fixed to the lid 22. In a battery 10 with this configuration the lid 22 is susceptible to deformation (typically warping deformation) by the crimping stress. However, because, according to the present aspect, the inorganic fiber 64 in the outside resin member 60 is oriented in parallel to the lid 22, this stress in the lid 22 is relaxed and deformation of the lid 22 can be stopped.

Furthermore, in this embodiment the battery 10 is additionally provided with a bolt 670 that has a head part 672 and a leg part 674 and that is disposed with the leg part 674 inserted in the bolt insertion hole 464A that is provided in the outside terminal part of the positive electrode terminal 40. The outside resin member 60 has an extension part 640 that extends along the outside terminal part of the positive electrode terminal 40. A bolt receiving hole 642, which receives the head part 672 of the bolt 670 and which limits the rotation of the bolt 670, is formed in the extension part 640 of the outside resin member 60. Here, when the inorganic fiber 64 is added to the outside resin member 60, the outside resin member 60 becomes hard although the heat resistance and mechanical strength of the outside resin member 60 are increased. Due to this, there is a risk that the outside resin member 60 will undergo cracking when the torque (fastening pressure) is too high when the bolt 670 is fastened. That is, a separate problem can be produced in that a high torque cannot be applied when the bolt is fastened.

Because, in response to this in accordance with the present structure, the inorganic fiber 64 in the outside resin member 60 is oriented in parallel (i.e., in the direction perpendicular to the direction of bolt fastening) to the lid 22, the outside resin member 60 readily undergoes elongation in the direction perpendicular to the direction of bolt fastening. As a consequence, even if a high torque is applied when the bolt is fastened, cracking of the outside resin member 60 is suppressed due to the elongation of the outside resin member 60 in the direction perpendicular to the direction of bolt fastening. The bolt 670 can therefore be fastened at a suitable fastening pressure (torque). As a result, relaxation of the fastening of the bolt 670 due to, for example, vibration applied to the battery can be avoided and various problems (for example, a decline in the closeness of contact between the outer terminal 460 and the connection member 112, resulting in corrosion, e.g., oxidation, at the contact interface between the outer terminal 460 and the connection member 112, an increase in electrical resistance, and so forth) caused by the relaxation of the fastening of the bolt 670 can be prevented.

In a preferred herein disclosed art, at least 50% by mass of the inorganic fiber 64 in the outside resin member 60 is disposed so that the fiber axial direction of the inorganic fiber is parallel to the long side 22B (refer to FIG. 2) of the lid 22. More preferably, at least 60% by mass (even more preferably at least 75% by mass and particularly preferably at least 90% by mass) of the inorganic fiber 64 is disposed parallel to the long side 22B (refer to FIG. 2) of the lid 22. This "parallel to" encompasses both perfectly parallel and, insofar as the effects of the invention are achieved, cases which can be regarded as substantially parallel. For example, the angle of intersection between the inorganic fiber 64 and the long side 22B of the lid 22 may be from 0° to 30°. The angle of intersection between the inorganic fiber 64 and the long side 22B of the lid 22 is preferably 0° or greater and less than 20° and more preferably less than 10°. In accordance with this structure, satisfactory room for elongation can be ensured when the bolt 670 is fastened because the outside resin member 60 undergoes preferential elongation in the long direction of the lid 22 and not the width direction of the lid 22, which has little room for elongation.

The direction of orientation of the inorganic fiber 64 can be adjusted by various methods. For example, a method in which the resin flow during molding (typically injection molding) of the outside resin member 60 is controlled using the gate location is an example of a method for adjusting the direction of orientation of the inorganic fiber 64. That is, the inorganic fiber added to the resin is filled into the mold (molder) together with the resin. At this point the inorganic fiber tends to undergo orientation (alignment) within the mold along the resin flow. Accordingly, the direction of inorganic fiber orientation can be freely adjusted by controlling the flow of the resin filled into the mold.

In addition to the nonaromatic resin composition and inorganic fiber, the outside resin member 60 may contain various additives on an optional basis as secondary components. These additives can be exemplified by antioxidants and preservatives. In a preferred herein disclosed aspect, the outside resin member 60 does not contain a phenolic heat stabilizer and does not contain a Cu—I-based heat stabilizer. A phenolic heat stabilizer can cause deterioration due to its absorption of scattered laser light during laser welding. With regard to Cu—I-based heat stabilizers, the constituent components can elute to the outside together with water absorbed by the outside resin member 60 and can then cause corrosion of other constituent members of the battery (for example, the terminals and case main body).

A suitable selection from among resin compositions that exhibit resistance to the electrolyte solution used can be used as the constituent material of the inside resin member 50. For example, a resin composition based on a resin such as a polyphenylene sulfide resin (PPS), polyimide resin, polyamideimide resin, polyetheretherketone resin (PEEK), polyetherketoneketone resin (PEKK), polyether sulfone resin (PES), and so forth, is preferably used. In addition, the inside resin member 50 may be formed from the same resin composition as the outside resin member 60. The inside resin member 50 according to the present embodiment is formed from PPS.

The structure (the external shape of the negative electrode terminal 80 and its outwardly projecting structure, and so forth) on the negative electrode side in the battery 10 of the present embodiment is approximately the same as on the positive electrode side excluding the material of the negative electrode terminal 80. Thus, one end of the negative electrode terminal 80 is connected by, for example, resistance welding, to the extension region 34A of the negative electrode sheet of the electrode assembly 30. This negative electrode terminal 80 is provided with a negative electrode inner terminal 820, which is formed with approximately the same shape as the positive electrode inner terminal 420, and with a negative electrode outer terminal 860, and the terminals 820, 860 are connected by riveting the projecting part (rivet part) of the inner terminal 820 to the first connecting part of the outer terminal 860. This riveting is carried out, as on the positive electrode side, with the inside resin member 50, the lid 22, and the outside resin member 60 sandwiched between the terminals 820, 860. The outer terminal 860 is formed with a stepped shape that has the first connecting part and a second connecting part. It is structured such that a bolt 670 is upwardly mounted through a bolt insertion hole provided in its second connecting part and the connection member 112 for external connection can be connected (fixed) to the leg part 674 of the bolt. The constituent material of the inner terminal 820 and the outer terminal 860 on the negative electrode side is preferably a metal having a good conductivity, and copper is typically used. The negative electrode inner terminal 820 and the negative electrode outer terminal 860 in the present embodiment are made of copper. The material and shape of the inside resin member 50 and the outside resin member 60 are the same as on the positive electrode side.

<The Battery Production Method>

A lithium ion secondary battery 10 having the indicated structure can be advantageously produced (fabricated), for example, by approximately the following procedure. That is, a lid 22 having the above-described structure is prepared and the inside resin member 50 is set on its inside surface and the outside resin member 60 and the positive electrode outer terminal 460 are set on its outside surface. At this point the head part 672 of the bolt 670 is placed in the bolt receiving hole 642 of the outside resin member 60 and the outer terminal 460 is placed from thereabove. The rivet part (projecting part) 426 of the positive electrode inner terminal 420 is passed through the terminal exit aperture 242, the through hole 622 of the outside resin member 60, and the outer terminal 460 to project outward and the end of this rivet part (projecting part) is riveted (crimped) by expanding its diameter radially, thereby mounting the positive electrode terminal 40 in the terminal exit aperture 242 of the lid 22. At this point, the inside resin member 50, the lid 22, the outside resin member 60, and the positive electrode outer terminal 460 are sandwiched between the crimping portion of the rivet part 426 and the base part 424 and a pressing force is exerted on them, and as a result the inside resin member 50 and the outside resin member 60 are compressed in the axial direction of the terminal and the individual members are brought into intimate contact and the terminal exit aperture 242 of the lid 22 is thus sealed. The negative electrode terminal 80 is mounted in the terminal exit aperture 244 of the lid 22 in the same manner as on the positive electrode side. Proceeding in this manner, a lid-terminal assembly is obtained in which both of the electrode terminals 40 and 80 have been formed into a single article with the lid 22.

The positive electrode terminal 40 and the negative electrode terminal 80 are then joined (for example, welded), respectively, to the two ends in the axial direction of a wound electrode assembly 30 having the above-described structure. By doing this, a lid unit (electrode assembly-lid-terminal assembly) is obtained in which the electrode assembly 30 is formed into a single article with the aforementioned lid-terminal assembly. In addition, the electrode assembly 30 is housed in the interior of the case main body 21 through its opening and the lid 22 is thus mounted in the opening and the seam 25 between the lid 22 and the case main body 21 is laser welded.

The conditions for the laser welding should be conditions that can airtightly join the lid 22 to the case main body 21 by welding, but are not otherwise particularly limited. For example, a YAG laser, fiber laser, carbon dioxide laser, DOE laser, LD laser, and so forth can be used as appropriate for the laser light that is used. A continuous oscillation (CW) or pulsed oscillation can be used. Viewed from the standpoint of raising the productivity, CW oscillation, which readily increases the welding rate, is advantageous. The amount of energy applied in welding by CW oscillation (typically carried out in a regime in which the laser is irradiated on the molten metal such that, utilizing heat conduction from the molten metal, the melt region is successively moved along the seam 25 by melting the neighboring location) is generally larger than for welding by pulsed oscillation, and as a consequence stopping the deterioration and deformation of the outside resin member using the present invention is particularly significant in the former case. The herein disclosed art can be advantageously applied, for example, to laser welding of the lid 22 and the main body 21 at an energy density of 0.2 to 100 kW/mm$^2$. In addition, it can be advantageously applied to laser welding of the lid 22 and the main body 21 at a welding rate of 2 to 10 m/min.

An electrolyte solution is then filled into the case 20 through a liquid fill port 28 provided in the lid 22. The same nonaqueous electrolyte solutions as heretofore used in lithium ion secondary batteries can be used without particular limitation as this electrolyte solution. In the present embodiment, an electrolyte solution is used that contains LiPF$_6$ at a concentration of approximately 1 mol/liter in a mixed solvent of ethylene carbonate and diethyl carbonate (for example, a mixed solvent with a volume ratio of approximately 1:1). The case 20 is then sealed by attaching (for example, welding) a sealing cap 29 to the liquid fill port 28. A lithium ion secondary battery 10 can be produced (fabricated) proceeding as described above.

<The Battery Pack>

Figure 9:
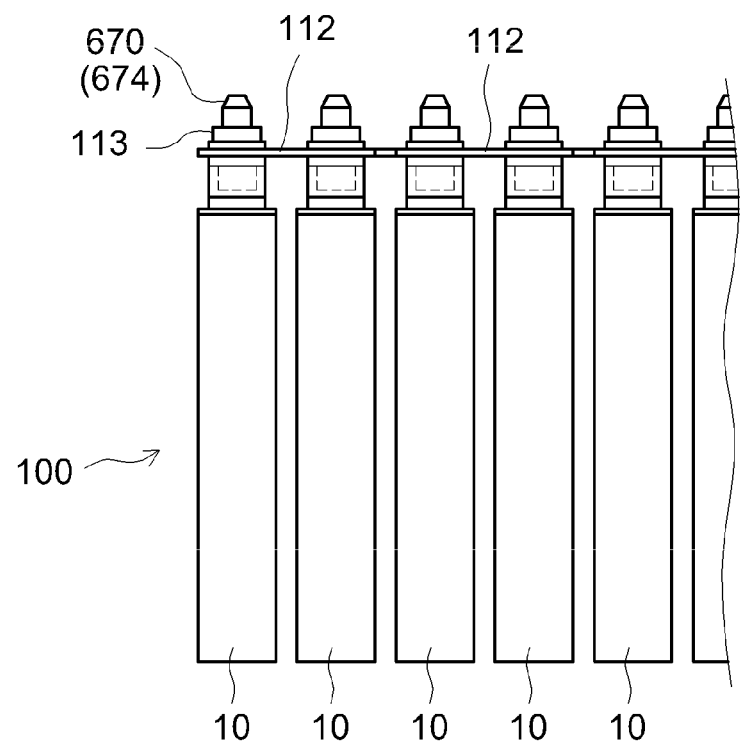
FIG. 9 is a side view that shows a portion of a battery pack according to an embodiment.
Figure 10:
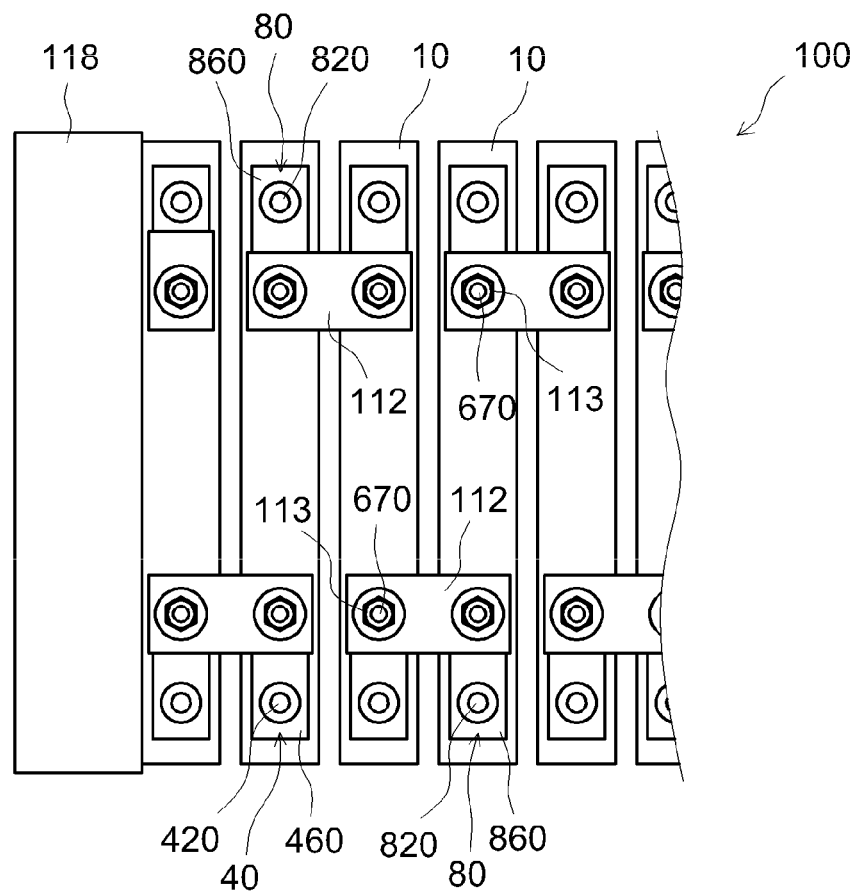
FIG. 10 is a plan view that shows a portion of a battery pack according to an embodiment.

An example is described in the following of the structure of a battery pack that has the lithium ion secondary battery 10 with the aforementioned structure as a unit cell and that is provided with a plurality of these unit cells. As shown in FIGS. 9 and 10, in this battery pack 100, the wide face of the case 20 is arrayed in the facing direction (stacking direction) while a plurality (typically at least 10 and preferably about 10 to 30, for example, 20) of the lithium ion secondary batteries (unit cells) 10 are reversed from one to the other such that the individual positive terminals 40 and negative terminals 80 are disposed in alternation. A cooling plate (not shown) with a prescribed shape is sandwiched between the thusly arrayed unit cells 10. This cooling plate functions as a heat-dissipating member in order to efficiently dissipate the heat produced within the individual unit cells 10 during their operation and has a shape (for example, a shape in which a plurality of parallel grooves are disposed in the surface and run perpendicularly from one edge of a rectangular cooling plate to the opposite edge) that enables the introduction of a cooling fluid (typically air) between the unit cells 10. The cooling plate is advantageously made of a metal with a good thermal conductivity or is made of a lightweight, rigid polypropylene or other synthetic resin.

As shown in FIG. 10, a pair of end plates (restraining plates) 118 are disposed at the two ends of the thusly arrayed unit cells 10 and cooling plates (only one end of this array is shown in FIG. 10). The thusly arrayed unit cells 10 and cooling plates are restrained, with the application of a prescribed restraining pressure, by a fastening restraint band (not shown) installed so as to bridge between the two end plates. In addition, for neighboring unit cells 10, the positive electrode terminal 40 on one is electrically connected by a connection member (bus bar) 112 to the negative electrode terminal 80 on the other. More specifically, the positive electrode terminal 40 on one is electrically connected to the negative electrode terminal 80 on the other by the insertion of the respective bolt leg parts 674 projecting upward from the outer terminals of neighboring unit cells 10 into through holes provided at the two ends of the connection member 112 and fastening with a nut 113 from above. A battery pack 100 with a desired voltage is fabricated by thusly connecting the individual unit cells 10 in series. While the example of an array of the unit cells 10 and cooling plates in a single line is shown in FIG. 10, the unit cells 10 and cooling plates may be arrayed in two lines or in three or more lines.

Several examples relating to the present invention are described in the following, but there is no intent to limit the present invention to what is given in these specific examples.

Test Example 1

A lithium ion secondary battery (unit cell) according to the embodiment described above was fabricated using the procedure described above. A dispersion of a glass fiber with the composition $SiO_2$ in a resin matrix of PA66 was used as the outside resin member. The glass fiber in the outside resin member was disposed such that the fiber axial direction of the glass fiber was parallel to the outer surface of the lid.

Figure 11:
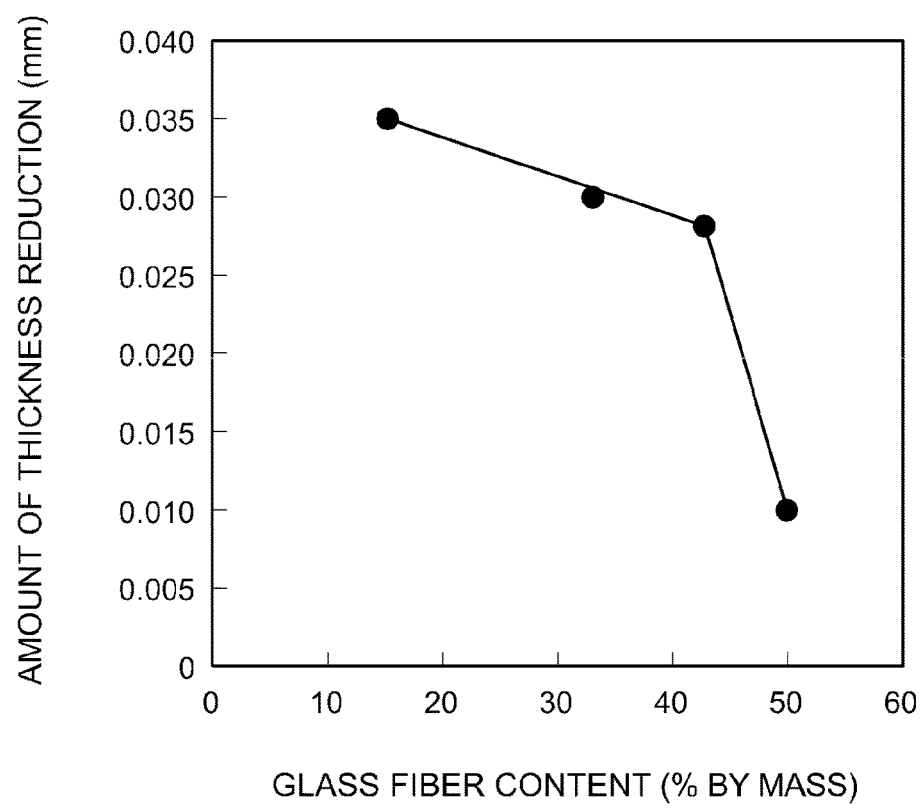
FIG. 11 is a graph that shows the relationship between the glass fiber content and the amount of reduction in the thickness of the outside resin member.

A plurality of samples having different glass fiber contents in the outside resin member were fabricated in this example. The amount of dimension reduction (amount of set) was measured for the thickness a (refer to FIG. 8) of the outside resin member by laser welding of the lid and case under the conditions below. The results are shown in FIG. 11. A graph showing the relationship between the glass fiber content and the amount of thickness reduction in the outside resin member is given in FIG. 11.

[Welding Conditions]
laser used: fiber laser (wavelength: 1060 to 1070 nm)
output: 2.8 kW
welding temperature: 250°
oscillation mode: continuous oscillation (CW)
beam diameter: diameter=0.8 mm
irradiation angle θ: 89°
minimum distance between the laser light track and the outside resin member: 1.0 mm As shown in FIG. 11, it was confirmed that laser welding-induced heat distortion (set) was inhibited by the use of a glass fiber-loaded outside resin member. In the case of the batteries tested here, a better suppression of the heat distortion (set) was obtained by having the glass fiber content be at least 50% by mass. Based on this result, the glass fiber content in the outside resin member is preferably at least approximately 50% by mass.

Test Example 2

The following experiment was run in order to confirm the influence exercised by the direction of glass fiber orientation on the battery strength. Thus, proceeding as in Test Example 1, an outside resin member having glass fiber dispersed in a resin matrix of PA66 was prepared and a lithium ion secondary battery was fabricated. The glass fiber content in the outside resin member was 33% by mass.

Figure 12:
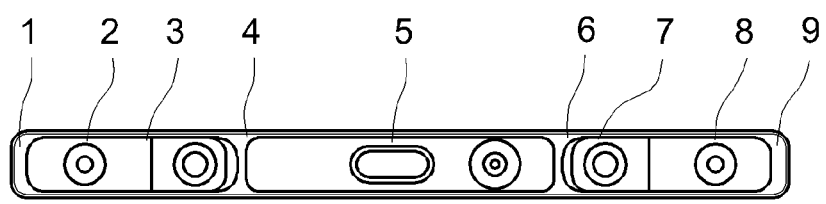
FIG. 12 is a diagram that shows the measurement locations for the amount of lid deformation.

Samples 1 and 2 having different directions of glass fiber orientation were produced in this example. In sample 1, the fiber axial direction of the glass fiber in the outside resin member was disposed in parallel to the outer surface of the lid. In sample 2, the fiber axial direction of the glass fiber in the outside resin member was disposed orthogonal to the outer surface of the lid. The amount of lid deformation was measured after each of the terminals had been fixed to the lid by the riveting of the rivet part (projecting part) of each terminal. The amount of lid deformation was measured at 9 different positions in the long direction of the lid 22 as shown in FIG. 12. The results are shown in FIG. 13.

Figure 13:
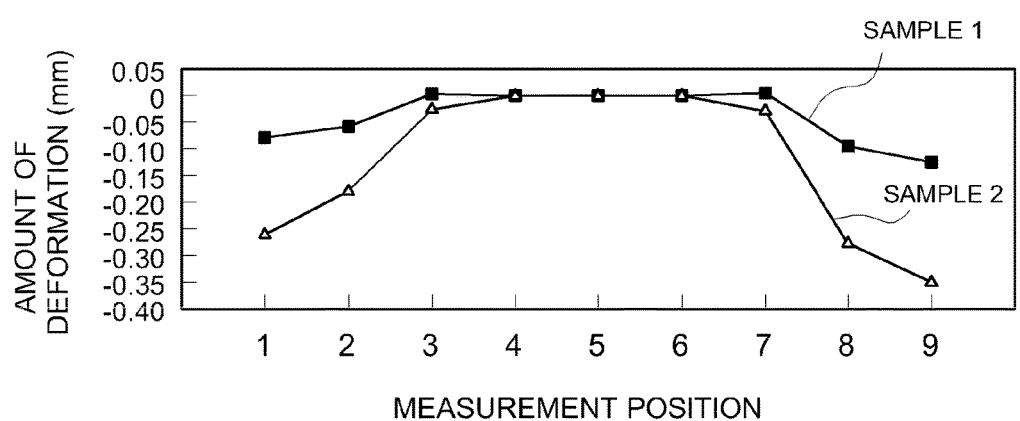
FIG. 13 is a graph that shows the amount of lid deformation according to an example and a comparative example.

As shown in FIG. 13, the lid deformation was improved in sample 1, in which the glass fiber was disposed in parallel to the lid, over that in sample 2, in which the glass fiber was disposed perpendicular to the lid. This result shows that the glass fiber in the outside resin member is desirably oriented in parallel to the lid.

The invention has been described in the preceding based on preferred embodiments, but this description is not limiting and of course various modifications will be possible.

INDUSTRIAL APPLICABILITY

Figure 14:
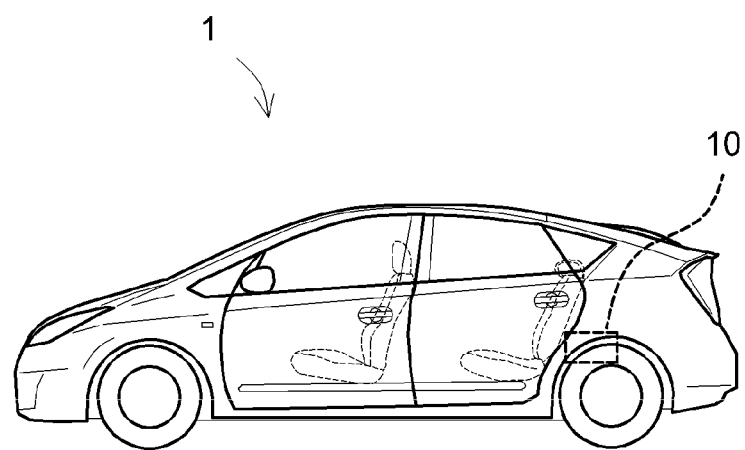
FIG. 14 is a schematic side view that shows a battery-equipped vehicle (an automobile) according to an embodiment.
Figure 15:
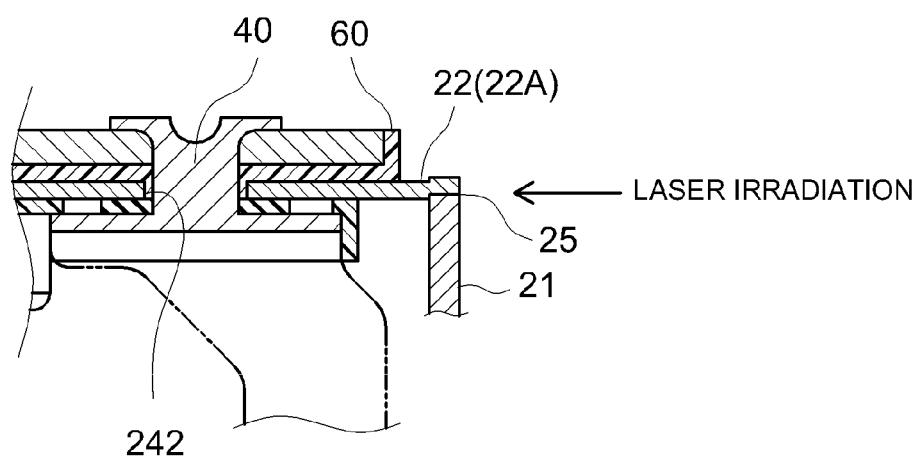
FIG. 15 is a partial cross-sectional view that shows a conventional sealed battery.

The sealed battery according to the present invention (typically a secondary battery, for example, a lithium ion secondary battery) can be advantageously used as a power source for a motor (electric motor) installed in particular in a vehicle, for example, an automobile. Accordingly, a vehicle (typically an automobile, for example, a hybrid automobile, electric automobile, and so forth) 1 equipped with the instant battery 10 (typically a battery pack 100 formed by the serial connection of a plurality of these batteries 10) as a drive power source, for example, as shown schematically in FIG. 14, is provided as another aspect of the present invention.

The invention claimed is:

1. A sealed battery comprising:
a case main body that has an opening;
an electrode assembly that is housed in the case main body;
a lid that is fixed to the opening in the case main body and that has a through hole;
a terminal that is electrically connected to the electrode assembly, and a portion of which passes through the through hole in the lid and is thereby exposed to the outside of the battery; and
an outside resin member that is disposed on an outer surface of the lid outside the battery and that covers a circumference of the portion of the terminal exposed to the outside,
wherein
the lid is fitted into the opening of the case main body such that the edge of the lid outer surface, on which the outside resin member is disposed, and the rim of the opening in the case main body are aligned to be in contact with each other and the lid is fixed to the case main body by executing laser welding on the resultant seam;
the outside resin member is formed from a resin matrix formed of a nonaromatic resin composition and inorganic fibers present dispersed in the resin matrix; and
at least 50% by mass of the inorganic fibers in the outside resin member is disposed such that the fiber axial direction of the inorganic fibers is parallel to the outer surface of the lid.

2. The battery according to claim 1, wherein
the opening in the case main body is formed in a rectangular shape;
the lid has a pair of long sides and a pair of short sides that conform to the rectangular shape of the opening; and
at least 50% by mass of the inorganic fiber in the outside resin member is disposed such that the fiber axial direction of the inorganic fibers is parallel to the long side of the lid.

3. The battery according to claim 1, wherein the content of the inorganic fibers in the outside resin member is 45% by mass to 60% by mass with reference to the total mass of the outside resin member.

4. The battery according to claim 1, wherein the inorganic fibers are glass fibers.

5. The battery according to claim 1, wherein the average fiber diameter of the inorganic fiber is 3 μm to 50 μm.

6. The battery according to claim 1, wherein the outside resin member contains neither a phenolic heat stabilizer nor a Cu—I-based heat stabilizer.

7. The battery according to claim 1, wherein at least 80% by mass of the nonaromatic resin composition is at least one selected from polyamide, polyacetal, perfluoroalkoxyalkane, and polymethyl methacrylate.

8. The battery according to claim 1, wherein
the outside resin member has a through hole through which the terminal passes;
the terminal has
a base part that is disposed in the interior of the battery, and
a rivet part that extends from the base part, passes through the through hole in the lid and the through hole in the outside resin member, and is exposed to the outside of the battery; and
the rivet part of the terminal is crimped so as to compress the outside resin member in the direction of the axis of the terminal.

9. The battery according to claim 1, wherein
the battery is further provided with a bolt that has a head part and a leg part and that is disposed such that the leg part is inserted into a bolt insertion hole that is provided in an outside terminal part of the terminal;
the outside resin member has an extension part that extends along the outside terminal part of the terminal; and
a bolt receiving hole that receives the head part of the bolt and limits bolt rotation, is formed in the extension part of the outside resin member.

10. A battery pack in which the battery according to claim 9 is a unit cell, wherein
the battery pack is provided with a plurality of unit cells and with a connection member that establishes connection between the terminals of these unit cells, and
the connection member is fastened to the outside terminal part of the terminal by passing the leg part of the bolt through a bolt insertion hole in the connection member and fastening a nut to the bolt.

* * * * *